July 24, 1956

A. MATTHEWS 2,756,385

APPARATUS FOR MEASURING MECHANICAL QUANTITIES

Filed Oct. 5, 1954

INVENTOR
ARNOLD MATTHEWS
BY
ATTORNEY

United States Patent Office 2,756,385
Patented July 24, 1956

2,756,385

APPARATUS FOR MEASURING MECHANICAL QUANTITIES

Arnold Matthews, Stretford, England, assignor to The General Electric Company Limited, London, England Application October 5, 1954, Serial No. 460,400

Claims priority, application Great Britain October 6, 1953

4 Claims. (Cl. 324—34)

This invention relates to apparatus for measuring mechanical quantities, and is an improvement and/or modification of the invention forming the subject of Patent No. 2,679,628.

According to the present invention, apparatus for measuring mechanical quantities comprises in combination at least one inductor whose inductance is variable in accordance with the magnitude of the quantity to be measured, a dynamometer having its field winding wound on a core of magnetic material which has a gap in which the moving coil is disposed, the construction of the dynamometer being such that substantially no mechanical restoring torque is exerted on the moving coil, means for applying alternating voltages derived from the same source to the field winding and to a circuit including the inductor(s), means for deriving an output voltage from said circuit which varies in magnitude and/or phase in accordance with variations of the inductance of the inductor(s), and means for injecting said output voltage in series into a circuit including the moving coil, the arrangement being such that an indication of the magnitude of the quantity measured is given by the deflection of the moving coil from a predetermined position.

In one preferred embodiment of the invention, the apparatus includes two inductors whose inductances are differentially variable in accordance with the magnitude of the quantity to be measured, the inductors being included in adjacent arms of a bridge circuit across one diagonal of which said alternating voltage is applied and the output voltage being derived from the other diagonal of the bridge circuit. In this case, the alternating voltage may conveniently be applied to the bridge circuit by means of an auxiliary winding wound on the core of the dynamometer.

One arrangement in accordance with the invention and relating to apparatus suitable for measuring displacements or pressures will now be described by way of example with reference to the accompanying drawings in which.

Figure 1:
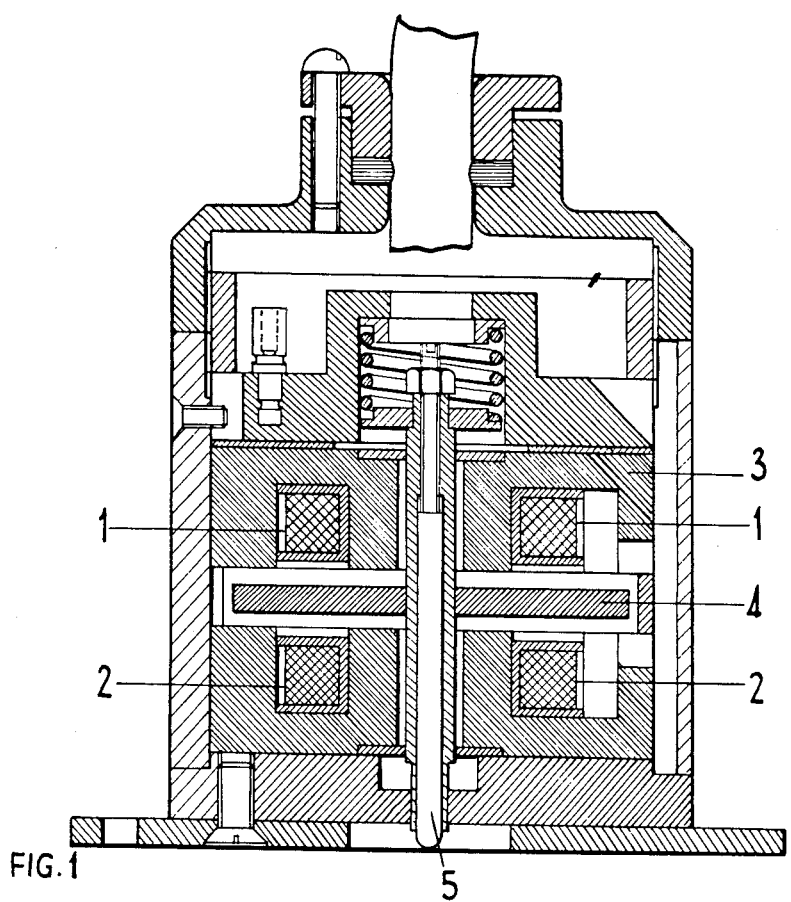
Figure 1 is a central section through an electro-magnetic measuring head for use in measuring displacements or pressures.

The apparatus includes two main parts, an electromagnetic measuring head and an iron-cored dynamometer. Referring to Figure 1 the measuring head includes two coils 1 and 2 which are disposed coaxial with each other and are surrounded by a core of magnetic material. The core includes a fixed part 3 and a movable part 4 which is disposed between the two coils 1 and 2 and is mounted on a spring-biased spindle 5 disposed coaxial with the coils 1 and 2 and movable longitudinally in correspondence with the magnitude of the displacement or pressure to be measured. The longitudinal movement of the spindle 5 is arranged to cause differential variations in the inductances of the two coils 1 and 2, so that the values of these inductances will depend upon the magnitude of the displacement or pressure being measured.

Figure 2:
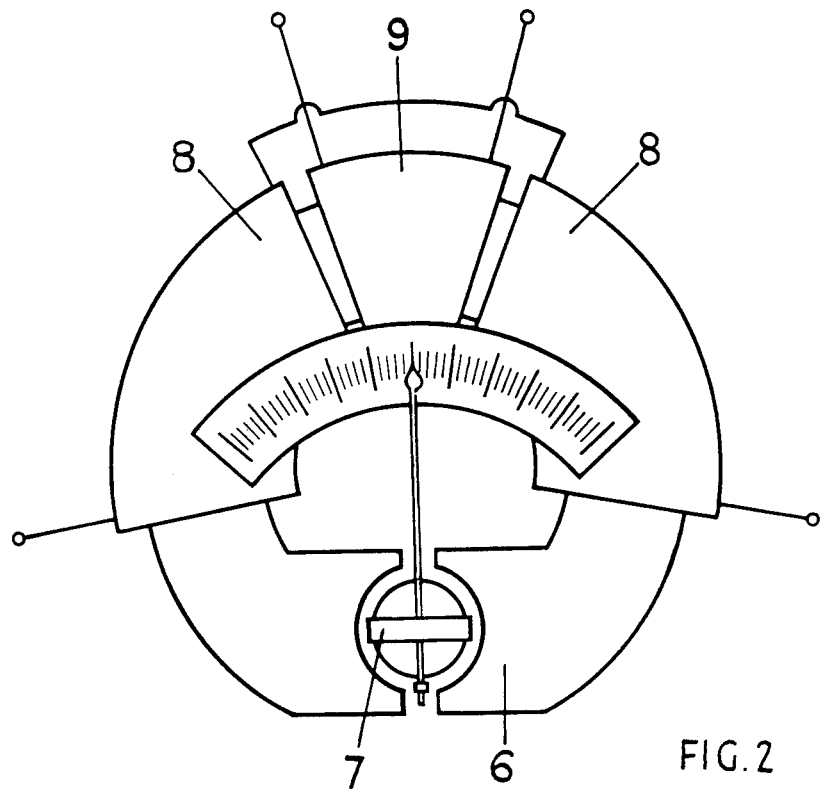
Figure 2 is a diagrammatic representation of an iron-cored dynamometer type instrument for use in connection with the measuring head shown in Figure 1.
Figure 3:
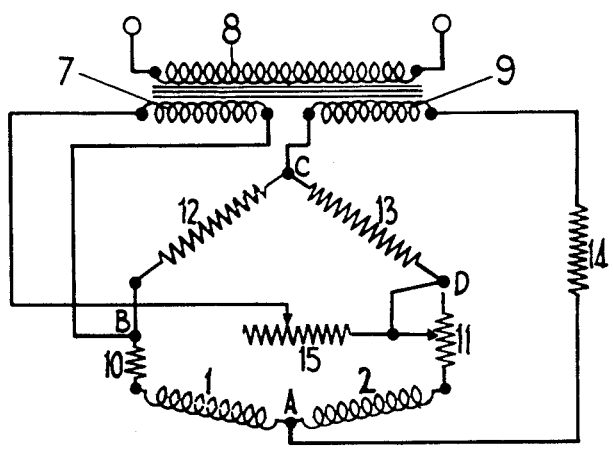
Figure 3 is a circuit diagram of the arrangement in which the measuring head shown in Figure 1 and the dynamometer as shown in Figure 2 are used.

Referring to Figure 2 the dynamometer is identical in construction with that illustrated in Figure 3 of the drawings of Patent No. 2,679,628, and includes a ring shaped core 6 of magnetic material having a gap in which is disposed the moving coil 7, and upon which are wound a field winding 8 and an auxiliary winding 9. The construction of the dynamometer is such that substantially no mechanical restoring torque is exerted on the moving coil 7, and also such that the magnitude of the voltage induced in the moving coil 7 from the field winding 8 varies substantially linearly with respect to its angular position, being zero at the position corresponding to half scale deflection and changing sign as the moving coil 7 rotates through this position.

Referring to Figure 3 the coils 1 and 2 of the measuring head are connected in a bridge circuit ABCD, one coil 1 being connected in the arm AB in series with a fixed resistor 10, and the other coil 2 being connected in the arm AD in series with a variable resistor 11. The arms BC and CD of the bridge circuit are constituted by a pair of equal resistors 12 and 13, and the auxiliary winding 9 of the dynamometer is connected across the diagonal AC in series with a fixed resistor 14. Across the diagonal BD of the bridge circuit is connected a variable resistor 15 in series with the moving coil 7 of the dynamometer.

In operation an alternating voltage, of substantially contant frequency and wave form, which may conveniently be derived from an alternating current mains supply, is applied to the field winding 8 of the dynamometer, so that voltages will be induced in the auxiliary winding 9 and the moving coil 7, the magnitude and phase of the latter being dependent on the angular position of the moving coil 7. An alternating voltage will be produced across the diagonal BD of the bridge circuit, the magnitude and phase of this voltage being dependent upon the degree of unbalance of the bridge circuit, and therefore upon the magnitude of the quantity being measured. The output voltage from the bridge circuit, derived across the diagonal BD, combines with the voltage induced in the moving coil 7 from the field winding 8 to produce a resultant voltage in the moving coil circuit which will cause a current to flow through the moving coil 7. Since there is no mechanical restoring torque on the moving coil 7, the moving coil 7 will be brought to rest in a position such that the current flowing through it is in phase quadrature with the magnetic flux produced in the core 6 of the dynamometer by the field winding 8, and it will therefore be seen that the angular position of the moving coil 7 will be dependent upon the output voltage from the bridge circuit, and therefore upon the magnitude of the quantity being measured.

It will be appreciated that when the bridge circuit is balanced, that is when the inductances of the two coils 1 and 2 are equal, the output voltage of the bridge circuit will be zero and the voltage induced in the moving coil 7 of the dynamometer must therefore also be zero, so that the moving coil 7 will be in the position corresponding to half scale deflection; when the moving coil 7 is deflected from this position, the sense of the deflection will of course depend upon the sense in which the bridge circuit is unbalanced. Where it is desired to measure both positive and negative values of displacement or pressure, the balance condition of the bridge circuit, and therefore half scale deflection of the dynamometer, may be arranged to correspond with zero displacement or pressure.

It will be appreciated that the sensitivity of the apparatus may be varied by varying the value of the resistor 15 connected in series with the moving coil 7 across the diagonal BD of the bridge circuit, and that zero adjustment may be made by varying the value of the resistor 11 in the arm AD of the bridge circuit. Furthermore, it can be shown that, since there is no mechanical restoring torque on the moving coil 7, the deflection of the moving coil 7 is independent of the magnitude of the alternating voltage applied to the field winding 8, so that the accuracy of the apparatus is unaffected by variations in the supply voltage.

I claim:

1. Apparatus for measuring mechanical quantities comprising a bridge circuit including in adjacent arms two inductors whose inductances are differentially variable in accordance with the magnitude of the quantity to be measured, said circuit having input terminals situated at one pair of opposite corners of the bridge circuit and output terminals situated at the other pair of opposite corners of the bridge circuit; a dynamometer comprising a moving coil; a core of magnetic material having a gap in which said moving coil is disposed, a mounting for the moving coil, said mounting constraining the moving coil to rotate in said gap whilst exerting substantially no mechanical restoring torque, a field winding wound on the core, and means for indicating the deflection of the moving coil from a predetermined position; means for applying alternating voltages derived from the same source and of substantially constant frequency and waveform to the field winding and to said input terminals whereby there appears at said output terminals an output voltage at least one of whose characteristics is variable in accordance with the variations of said inductances; and means for injecting said output voltage in series into a further circuit including the moving coil.

2. Apparatus according to claim 1 in which each of said adjacent arms includes in series with the respective inductor a resistor, at least one of the resistors being variable for the purpose of zero adjustment.

3. Apparatus according to claim 1 in which the moving coil is connected in series with a variable resistor across said other diagonal so that sensitivity adjustments can be made by varying the value of the variable resistor.

4. Apparatus according to claim 1 in which the alternating voltage is applied to the bridge by means of an auxiliary winding wound on the core of the dynamometer.

References Cited in the file of this patent

UNITED STATES PATENTS 1,686,679    Burrows _____ Oct. 9, 1928